United States Patent
Kim et al.

(10) Patent No.: US 8,611,596 B2
(45) Date of Patent: Dec. 17, 2013

(54) DISPLAY DEVICE AND CONTROL METHOD THEREOF

(75) Inventors: Sungun Kim, Seoul (KR); Soungmin Im, Seoul (KR)

(73) Assignee: LG Electronics Inc., Seoul (KR)

( * ) Notice: Subject to any disclaimer, the term of this patent is extended or adjusted under 35 U.S.C. 154(b) by 347 days.

(21) Appl. No.: 12/983,492

(22) Filed: Jan. 3, 2011

(65) Prior Publication Data

US 2011/0163954 A1  Jul. 7, 2011

(30) Foreign Application Priority Data

Jan. 4, 2010  (KR) .................. 10-2010-0000092

(51) Int. Cl.
*G06K 9/00* (2006.01)
*G06K 9/36* (2006.01)
*G06K 9/32* (2006.01)

(52) U.S. Cl.
USPC ........... 382/103; 382/118; 382/289; 382/291; 382/293

(58) Field of Classification Search
None
See application file for complete search history.

(56) References Cited

U.S. PATENT DOCUMENTS

| | | | |
|---|---|---|---|
| 6,950,534 B2 * | 9/2005 | Cohen et al. | 382/103 |
| 6,968,094 B1 * | 11/2005 | Gallagher | 382/296 |
| 7,778,444 B2 * | 8/2010 | Lee et al. | 382/103 |
| 2008/0218603 A1 | 9/2008 | Oishi | |
| 2008/0239104 A1 | 10/2008 | Koh | |
| 2009/0196461 A1 | 8/2009 | Iwamoto | |

FOREIGN PATENT DOCUMENTS

| | | |
|---|---|---|
| KR | 10-2008-0081859 A | 9/2008 |
| KR | 10-2008-0113997 A | 12/2008 |
| KR | 10-2009-0084727 A | 8/2009 |

* cited by examiner

*Primary Examiner* — Vikkram Bali
*Assistant Examiner* — Thomas Conway
(74) *Attorney, Agent, or Firm* — Birch, Stewart, Kolasch & Birch, LLP

(57) ABSTRACT

A display device and a control method thereof are provided. The display device includes a camera obtaining an image and a controller obtaining the direction of a user included in the obtained image and correcting the image such that the direction of the user is synchronized with the photographing direction of the camera. Even when the direction of the user does not correspond to the photographing direction of the camera, an image of the user can be corrected to correctly recognize a user's gesture.

15 Claims, 16 Drawing Sheets

(a)  (b)

FIG. 8
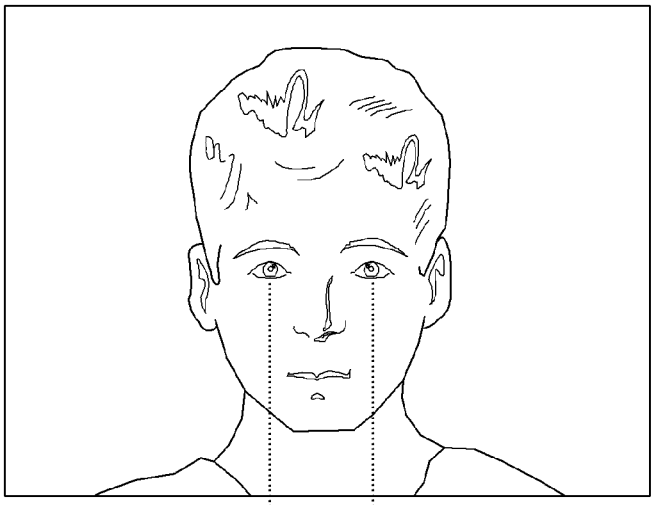
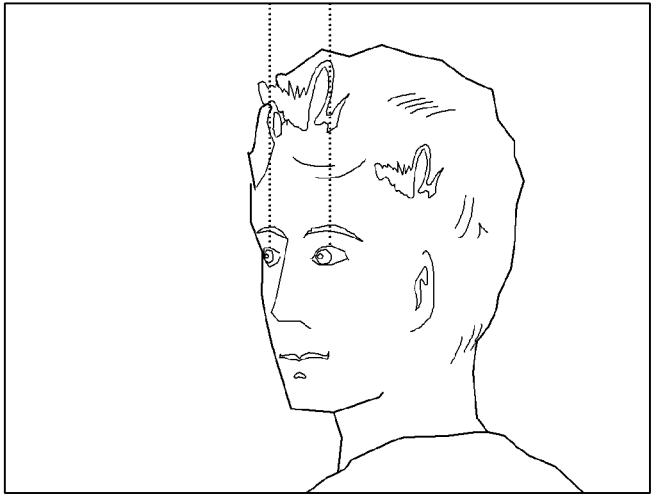

FIG. 14
(a) 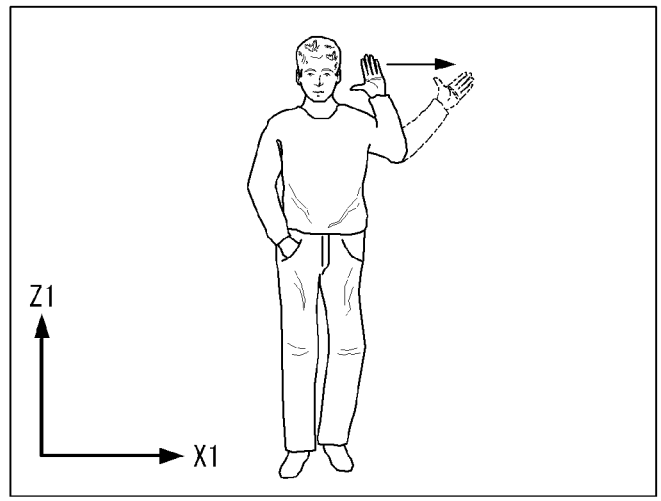
(b) 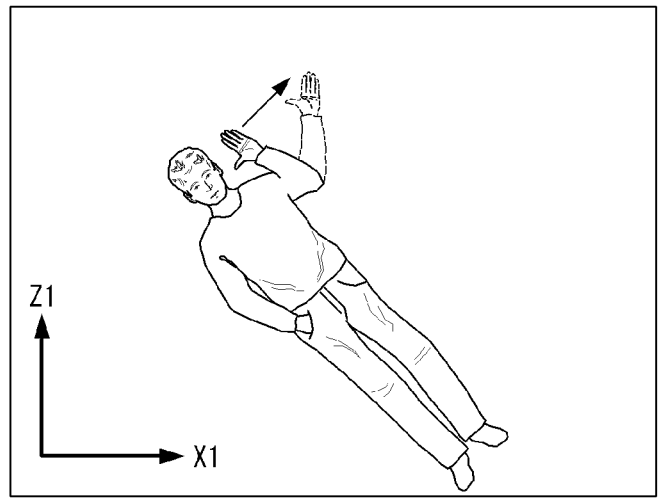

DISPLAY DEVICE AND CONTROL METHOD THEREOF

This application claims the benefit of Korean Patent Application No. 10-2010-0000092 filed on 4 Jan., 2010 which are hereby incorporated by reference.

BACKGROUND

1. Field

This document relates to a display device and a control method thereof and, more particularly, to a display device and a control method thereof to correct an image of a user, captured through a camera, when the direction the user is facing is different from the photographing direction of the camera so as to correctly recognize a gesture of the user.

2. Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

A terminal as a multimedia player can be referred to as a display device since it generally has a function of displaying video information.

Terminals can be divided into a mobile terminal and a stationary terminal. Examples of the mobile terminal can include laptop computers, cellular phones, etc. and examples of the stationary terminal can include television systems, monitor for desktop computers, etc.

SUMMARY

An aspect of this document is to provide a display device and a control method thereof to correct an image of a user, captured through a camera, when the direction the user is facing is different from the photographing direction of the camera so as to correctly recognize a gesture of the user.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIGS. 7 and 8 are views for explaining an implementation of the operation of setting image coordinates;

FIG. 14 shows images according to camera position; and

DETAILED DESCRIPTION

This document will now be described more fully with reference to the accompanying drawings, in which exemplary embodiments of this document are shown. This document may, however, be embodied in many different forms and should not be construed as being limited to the embodiments set forth herein; rather, there embodiments are provided so that this disclosure will be thorough and complete, and will fully convey the concept of this document to those skilled in the art.

Hereinafter, a mobile terminal relating to this document will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
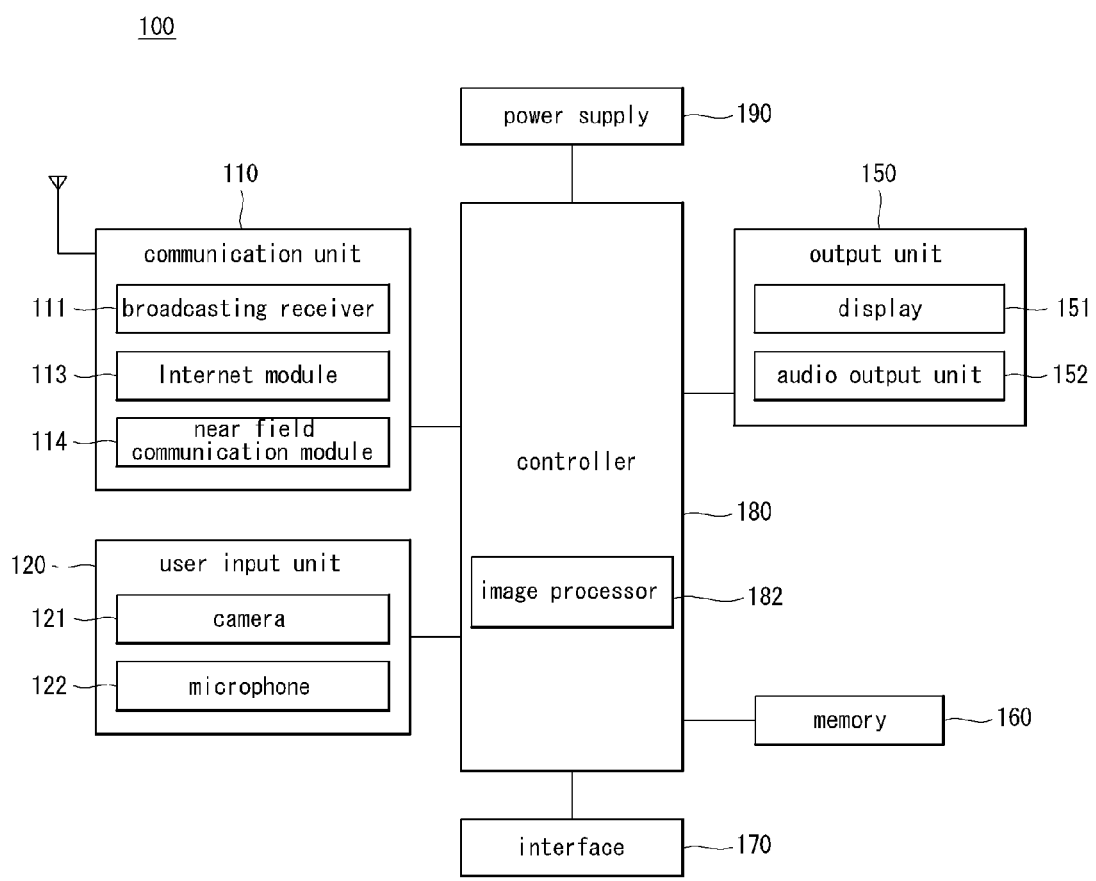
FIG. 1 is a block diagram of an implementation of a display device relating to an embodiment of this document.

FIG. 1 is a block diagram of a display device relating to an embodiment of this document.

As shown, the display device 100 may include a communication unit 110, a user input unit 120, an output unit 150, a memory 160, an interface 170, a controller 180, and a power supply 190. Not all of the components shown in FIG. 1 may be essential parts and the number of components included in the display device 100 may be varied.

The communication unit 110 may include at least one module that enables communication between the display device 100 and a communication system or between the display device 100 and another device. For example, the communication unit 110 may include a broadcasting receiving module 111, an Internet module 113, and a near field communication module 114.

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal of a data broadcasting signal.

The broadcasting related information may be information on a broadcasting channel, a broadcasting program or a broadcasting service provider, and may be provided even through a communication network.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. The broadcasting signals and/or broadcasting related information received through the broadcasting receiving module 111 may be stored in the memory 160.

The Internet module 113 may correspond to a module for Internet access and may be included in the display device 100 or may be externally attached to the display device 100.

The near field communication module 114 may correspond to a module for near field communication. Further, Bluetooth®, radio frequency identification (RFID), infrared data association (IrDA), ultra wideband (UWB) and/or ZigBee® may be used as a near field communication technique.

The user input 120 is used to input an audio signal or a video signal and may include a camera 121 and a microphone 122.

The camera 121 may process image frames of still images or moving images obtained by an image sensor in a video telephony mode or a photographing mode. The processed image frames may be displayed on a display 151. The camera 121 may be a 2D or 3D camera. In addition, the camera 121 may be configured in the form of a single 2D or 3D camera or in the form of a combination of the 2D and 3D cameras.

The image frames processed by the camera 121 may be stored in the memory 160 or may be transmitted to an external device through the communication unit 110. The display device 100 may include at least two cameras 121.

The microphone 122 may receive an external audio signal in a call mode, a recording mode or a speech recognition mode and process the received audio signal into electric audio data. The microphone 122 may employ various noise removal algorithms for removing or reducing noise generated when the external audio signal is received.

The output unit 150 may include the display 151 and an audio output module 152.

The display 151 may display information processed by the display device 100. The display 151 may display a user interface (UI) or a graphic user interface (GUI) relating to the display device 100. In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display. The transparent display may include a transparent liquid crystal display. The rear structure of the display 151 may also be of a light transmissive type. Accordingly, a user may see an object located behind the body of terminal through the transparent area of the terminal body, occupied by the display 151.

The display device 100 may include at least two displays 151. For example, the display device 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The audio output module 152 may output audio data received from the radio communication unit 110 or stored in the memory 160. The audio output module 152 may output audio signals related to functions, such as a call signal incoming tone and a message incoming tone, performed in the display device 100.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The display device 100 may also operate in relation to a web storage performing the storing function of the memory 160 on the Internet.

The interface 170 may serve as a path to all external devices connected to the mobile terminal 100. The interface 170 may receive data from the external devices or power and transmit the data or power to internal components of the display device terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The controller 180 may control overall operations of the mobile terminal 100. For example, the controller 180 may perform control and processing for voice communication. The controller 180 may also include an image processor 182 for pressing image, which will be explained later.

The power supply 190 receives external power and internal power and provides power required for each of the components of the display device 100 to operate under the control of the controller 180.

Various embodiments described in this document can be implemented in software, hardware or a computer readable recording medium. According to hardware implementation, embodiments of this document may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180 in some cases.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
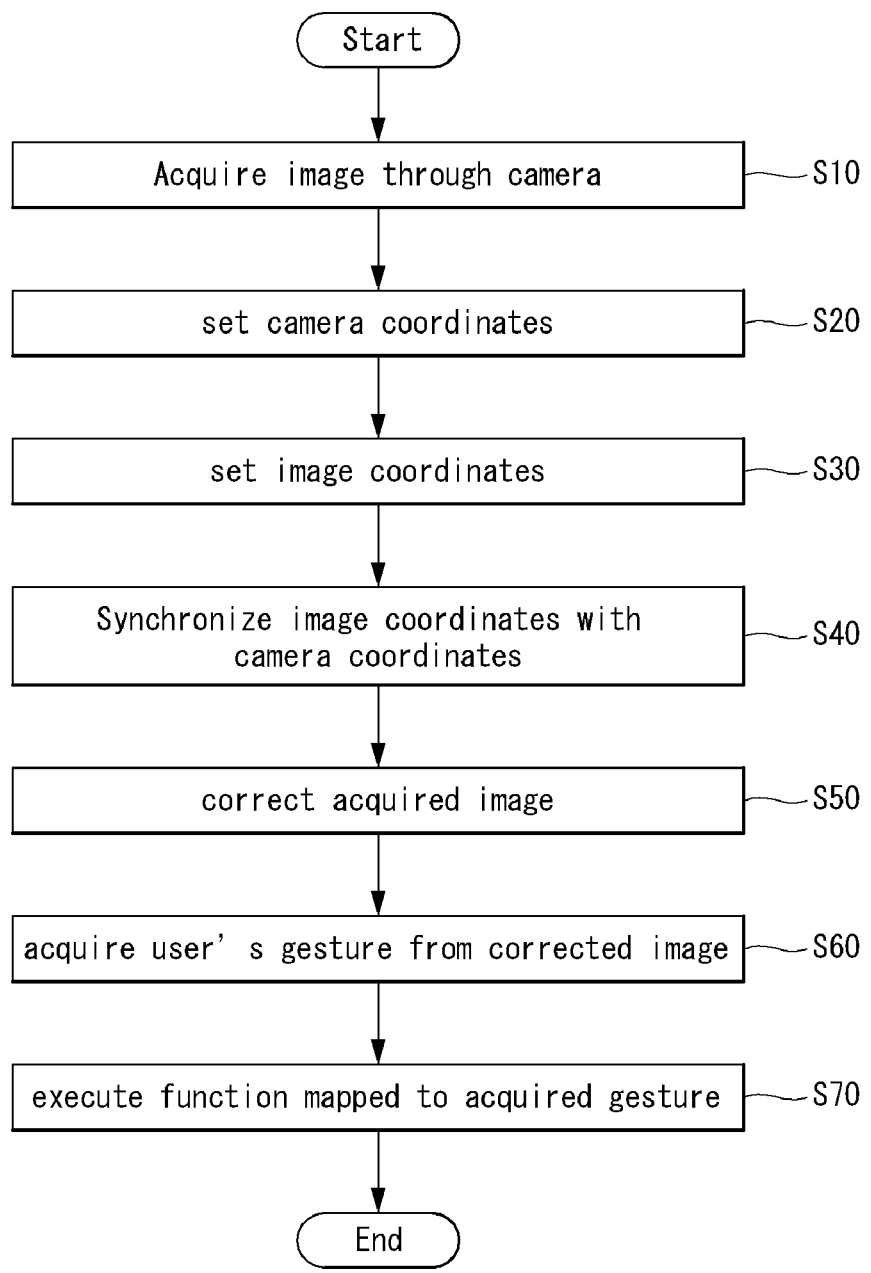
FIG. 2 is a flowchart illustrating an operation of the display device shown in FIG. 1.
Figure 3:
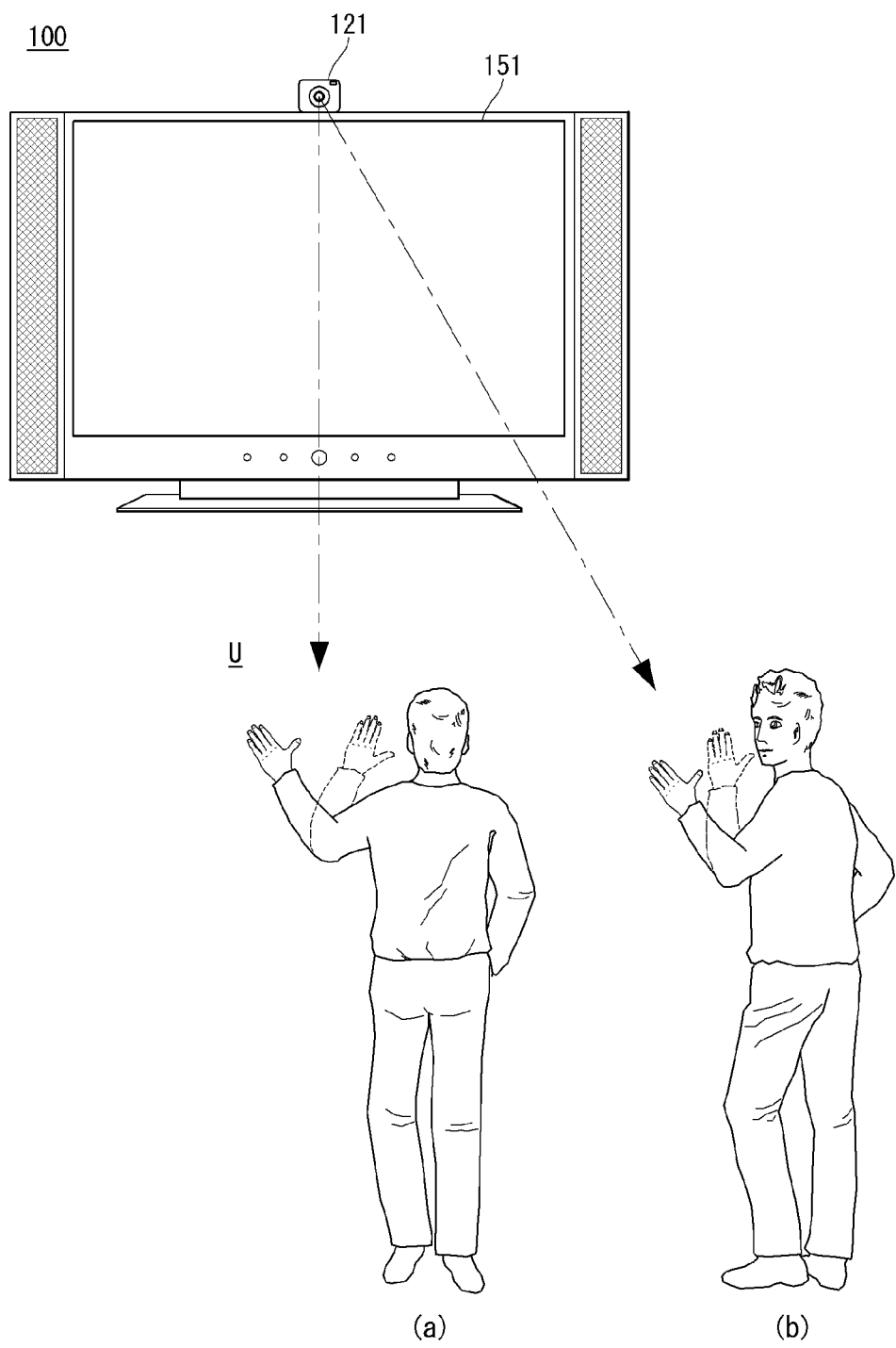
FIGS. 3 and 4 are views for explaining the operation of the display device, shown in FIG. 2.
Figure 4:
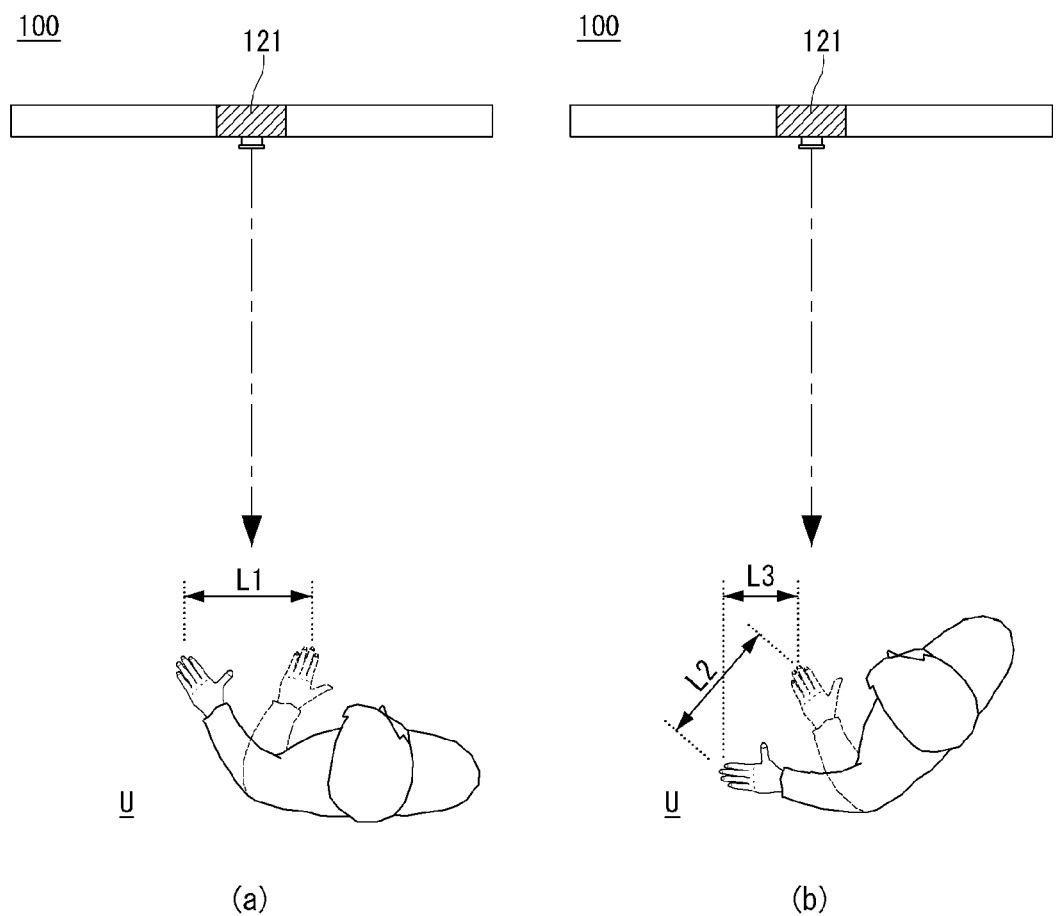

FIG. 2 is a flowchart illustrating an operation of the display device 100 shown in FIG. 1 and FIGS. 3 and 4 are views for explaining the operation of the display device, shown in FIG. 2.

As shown, the display device 100 may acquire an image through the camera 121 in operation S10. The camera 121 can obtain the image and transmit the image to the controller 180 of the display device 100, shown in FIG. 1. Though the camera 121 is integrated into the display device 100 in the present embodiment, the camera 121 may be provided separately from the display device 100, which will be explained later. The display device 100 may include a single or multiple cameras. Specifically, the display device 100 may include a single or multiple 2D or 3D cameras, or a combination of 2D and 3D cameras.

Upon the acquisition of the image through the camera 121, camera coordinates and image coordinates are set in operations S20 and S30. The camera coordinates mean coordinates based on the camera 121. The camera coordinates may be rectangular coordinates based on the orientation of the camera 121. For example, when the camera 121 captures an image while facing the front of the display device 100, the orientation of the camera 121 can correspond to the Y axis and the horizontal axis of the display 151 can correspond to the X axis.

The image coordinates mean coordinates based on a user U. The image coordinates may be rectangular coordinates based on the direction the user U is facing. For example, the image coordinates can be set based on the line passing both shoulders of the user U. That is, the line passing the both shoulders of the user U can be set to the X axis and the direction of the face of the user U, which is at an angle of 90° to the line, can be set to the Y axis. Furthermore, the image coordinates can be set based on the direction the user's face or body is facing.

When the camera coordinates and the image coordinates are set, the image coordinates may be synchronized with the camera coordinates in operation S40.

Referring to FIG. 3(a), the user U may make a gesture toward the camera 121 in front of the display device 100. For example, the user U can raise the left hand and wave it in a direction parallel with the plane of the display 151 to control the display device 100. When the user U makes the gesture toward the camera 121 in front of the camera 121, the gesture corresponding to the displacement made by the user U can be recognized through the camera 121. For example, if the user U raises the left hand and moves it by 30 centimeters in the horizontal direction, the camera 121 can capture an image of the user U who moves the left hand by 30 centimeters.

Referring to FIG. 3(b), the user may make a gesture in a position at an angle to the camera 121 of the display device 100. That is, the user U can stand in a position at a predetermined angle to the plane of the display 151 and raise and wave the left hand. In this case, the displacement of the user's gesture in the obtained image from the camera 121 may be distorted. Although the user U who is standing in a position at an angle to the display device 100 raises the left hand and move it by 30 centimeters in the horizontal direction, the camera 121 may capture an image of the user U who moves the left hand by centimeters in the horizontal direction due to the user's position at an angle to the plane of the display 151.

The relationship between the photographing direction of the camera 121 and the direction the user U is facing (direction of the user U) is described in detail with reference to FIG. 4.

Referring to FIG. 4(a), the user U who is located in parallel with the display device 100 in front of the camera 121 and may raise the left hand and move it by L1 from side to side. In this case, the camera 121 can capture an image of the user U who raises the left hand and moves it by L1 from side to side.

Referring to FIG. 4(b), the user U may be in position at an angle to the display device 100 may raise the left hand and move it by L2 from side to side. In this case, the camera 121 may capture an image of the user U who moves the left hand by L3 from side to side due to the photographing angle of the camera 121. That is, the displacement of the gesture made by the user U can be distorted. This distortion of displacement can become distinct when considered three-dimensionally. For example, when the user U is turned from the photographing angle of the camera 121 clockwise or counter clockwise, the gesture of the user U in the captured image can be distorted in all the directions of X, Y and Z axes. That is, though the user U actually waves the hand from side to side, the camera 121 captures an image of the user U who waves the hand diagonally.

If the displacement of the user's gesture is distorted when the user U makes the gesture in a position at an angle to the photographing direction of the camera 121, it is difficult to control the display device 100 according to the intuition of the user U. Specifically, if the user U is not located in parallel with the plane of the display 151, the user has to make a gesture larger or smaller than the gesture made by the user U who is in a position parallel with the plane of the display 151. This is inconvenient for the user U to control the display device 100 through a gesture. The display device 100 according to the present embodiment of this document can prevent image distortion through an operation of synchronizing the image coordinates with the camera coordinates.

Synchronization is pre-processing for correcting user's gestures into gestures having the same displacement if the gestures are identical irrespective of the user's position. The synchronization may correspond to an operation of making at least one axis of the camera coordinates based on the camera 121 parallel with at least one axis of the image coordinates based on the user U. For example, the synchronization makes the axis corresponding to the direction of the user U parallel with the axis corresponding to the photographing direction of the camera 121. Furthermore, the synchronization may correspond to an operation of correcting a captured image of the user who faces the camera 121 into an image of the user as if he/she faces the camera 121. When the synchronization is completed, user's gestures can be determined to have the same displacement if the user's gestures are identical irrespective of the directions in which the user makes the gestures.

The user's gesture may be acquired from the corrected image in operation S60 and a function mapped to the acquired user's gesture may be executed in operation S70.

To control the display device 100 according to a user's gesture, the camera captures an image of the user. For example, if the user raises the left hand and moves it from side to side, a function of moving an object OB shown in FIG. 10, displayed on the display 151, can be executed.

The controller 180 shown in FIG. 1 analyzes the corrected image to extract the user's gesture. The user's gesture may be extracted before the image is corrected. For example, the gesture is extracted from the image captured by the camera 121, and then the extracted gesture is synchronized with the photographing direction of the camera 121.

Figure 5:
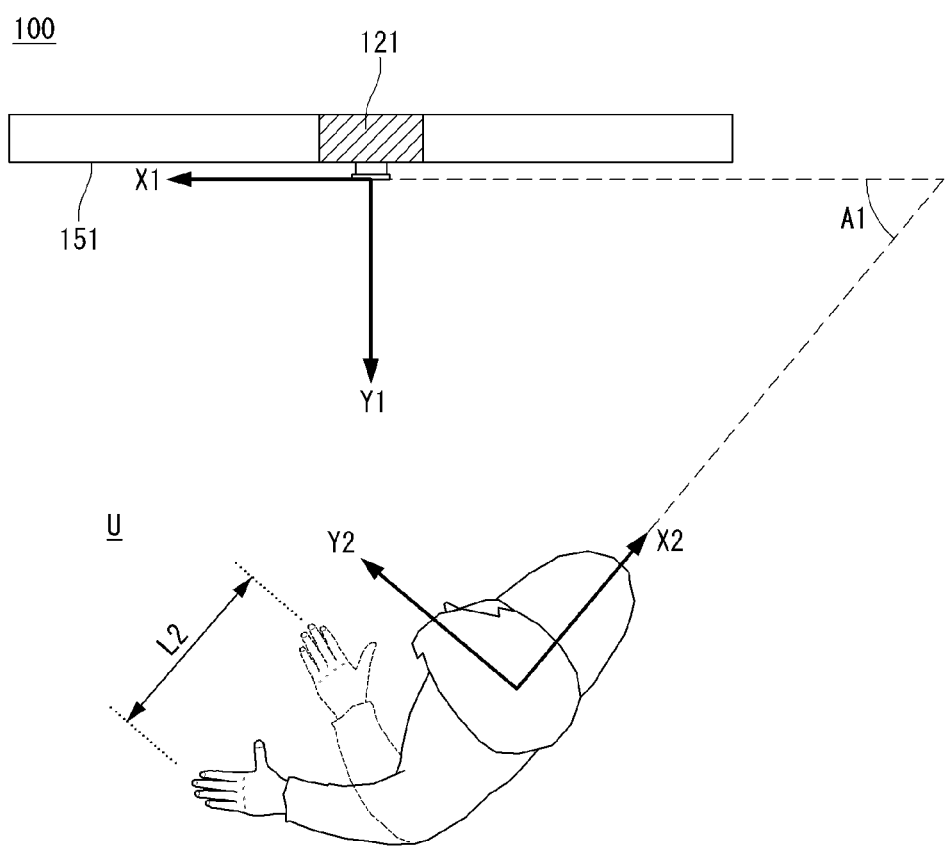
FIG. 5 is a view for explaining operations of setting camera coordinate and image coordinates, shown in FIG. 2.
Figure 6:
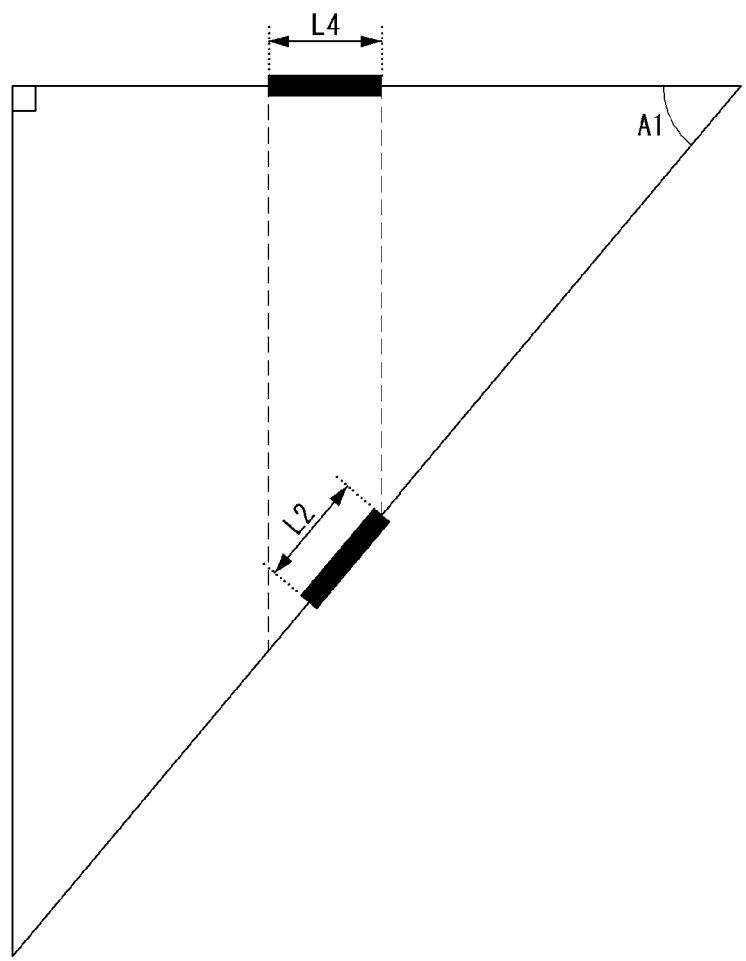
FIG. 6 illustrates a case that camera coordinates are not synchronized with image coordinates.

FIG. 5 illustrates the operations S20 and S30 of setting the camera coordinates and the image coordinates, shown in FIG. 2, and FIG. 6 illustrates the camera coordinates and the image coordinates shown in FIG. 5, which are not synchronized with each other.

Referring to FIGS. 5 and 6, the display device 100 can set the camera coordinates X1-Y1 based on the photographing direction Y1 of the camera 121 and first image coordinates X2-Y2 based on the direction the user U is facing.

The camera coordinates X1-Y1 can be set based on the photographing direction Y1 of the camera 121. If the camera 121 is integrated into the display device 100, the photographing direction Y1 faces the front of the display device 100. When the photographing direction Y1 faces the front of the display device 100, the second direction X1 corresponding to the other axis of the camera coordinates X1-Y1 may be parallel with the plane of the display 151.

The first image coordinates X2-Y2 can be set based on the direction X2 of the shoulder line of the user U in the present embodiment of this document. In the analysis of an image captured through the camera, the user's shoulder line direction X2 can be easily recognized since it is sharply defined.

When the user U raises and waves the left hand, the trace of the moving hand may be parallel with the user's shoulder line direction X2. However, the user's shoulder line direction X2 and the second direction X1 may not be correspond to each other and may be at a twisted angle A1 to each other. Accordingly, the length L2 of the trace of the user's gesture in parallel with the shoulder line direction X2 may be different from the length of the trace recognized by the camera 121.

Referring to FIG. 6, when the camera coordinates X1-Y1 and the first image coordinates X2-Y2 are not parallel with each other and they are at the twisted angle A1 to each other, image distortion corresponding to the twisted angle A1 can be generated. That is, while the trace of the user's gesture is L2, the trace of the gesture in the image captured by the camera 121 may be L4. L2 and L4 are different from each other due to the twisted angle A1. Accordingly, when a function of moving an image displayed on the display 151 is executed, the user can move the image only by L4 due to the image distortion although the user wants to move the image by L2. Consequently, the user cannot intuitively operate the display device 100.

Figure 7:
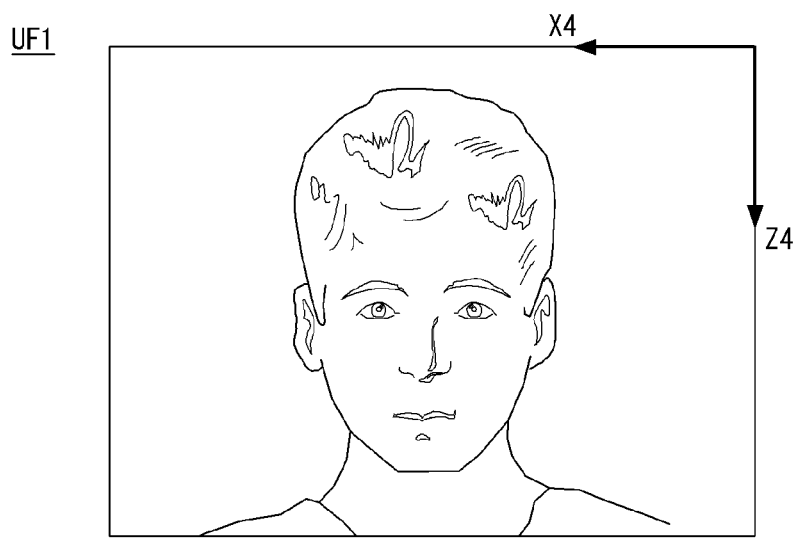

FIGS. 7 and 8 are views for explaining the operation S30 of setting the image coordinates, shown in FIG. 2, according to another embodiment of this document.

Referring to FIG. 7, image coordinates X4-Z4 can be set based on a first face image UF1. The directions of the body and face or a person correspond to each other, in general. Accordingly, the direction of the user can be recognized if the direction of the user's face is known. Furthermore, since the skin of the face and the head of the user are exposed, the positions of the eyes, nose and mouth can be relatively clearly specified through a method of recognizing light and shade. Accordingly, the image coordinates X4-Z4 can be set based on the first face image UF1 captured by the camera.

Referring to FIG. 8(a), the first face image UF1 may face the camera 121. Referring to FIG. 8(b), a second face image UF2 captured by the camera may face a direction at an angle to the camera 121. The first distance E1 between the eyes in the first face image UF1 may different from the second distance E2 between the eyes in the second face image UF2. That is, the second distance E2 may be shorter than the first distance E1. The controller 180 shown in FIG. 1 can determine which direction the user's face is facing based on the difference between the first and second distances E1 and E2. If the direction the user's face is facing is known, the image coordinates X4-Z4 shown in FIG. 7 can be set based on the user's face.

Figure 9:
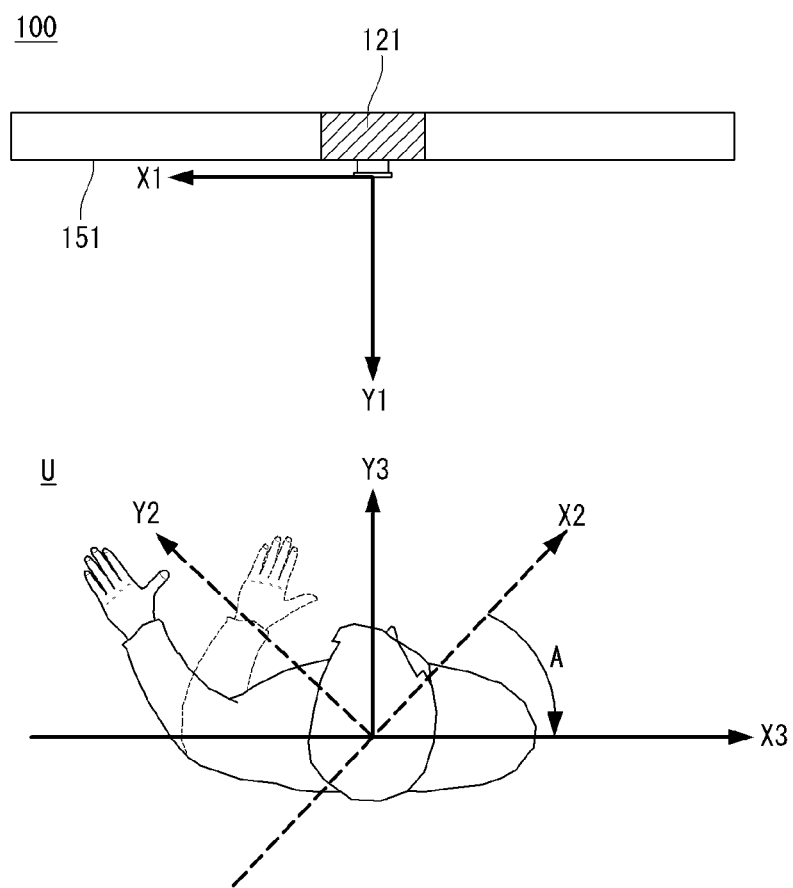
FIG. 9 is a view for explaining synchronization according to the camera coordinates and the image coordinates, shown in FIG. 5.

FIG. 9 is a view for explaining the operation of synchronizing the camera coordinates and the image coordinates shown in FIG. 5 with each other.

Referring to FIG. 9, the user U may make a gesture in the direction corresponding to the first image coordinates X2-Y2. That is, the user may face the direction Y2 and make a gesture in the direction Y2.

When the camera coordinates X1-Y1 and the first image coordinates X2-Y2 are set, the controller 180 shown in FIG. 1 can calculate a twisted angle A. That is, the controller 180 shown in FIG. 1 can calculate the angle between the line extended from the Y1 axis and the Y2 axis to produce the twisted angle A.

When the twisted angle A is calculated, the image captured by the camera 121 can be rotated to be synchronized with the camera coordinates X1-Y1. Specifically, the range of the gesture actually made by the user U can be calculated by applying the twisted angle A and the trace of the user's gesture included in the captured image to trigonometrical function. Accordingly, even when the user U stands in the direction corresponding to the first image coordinates X2-Y2, the image of the user U who stands in the direction corresponding to the second image coordinates X3-Y3, which faces the camera 121, can be obtained.

Figure 10:
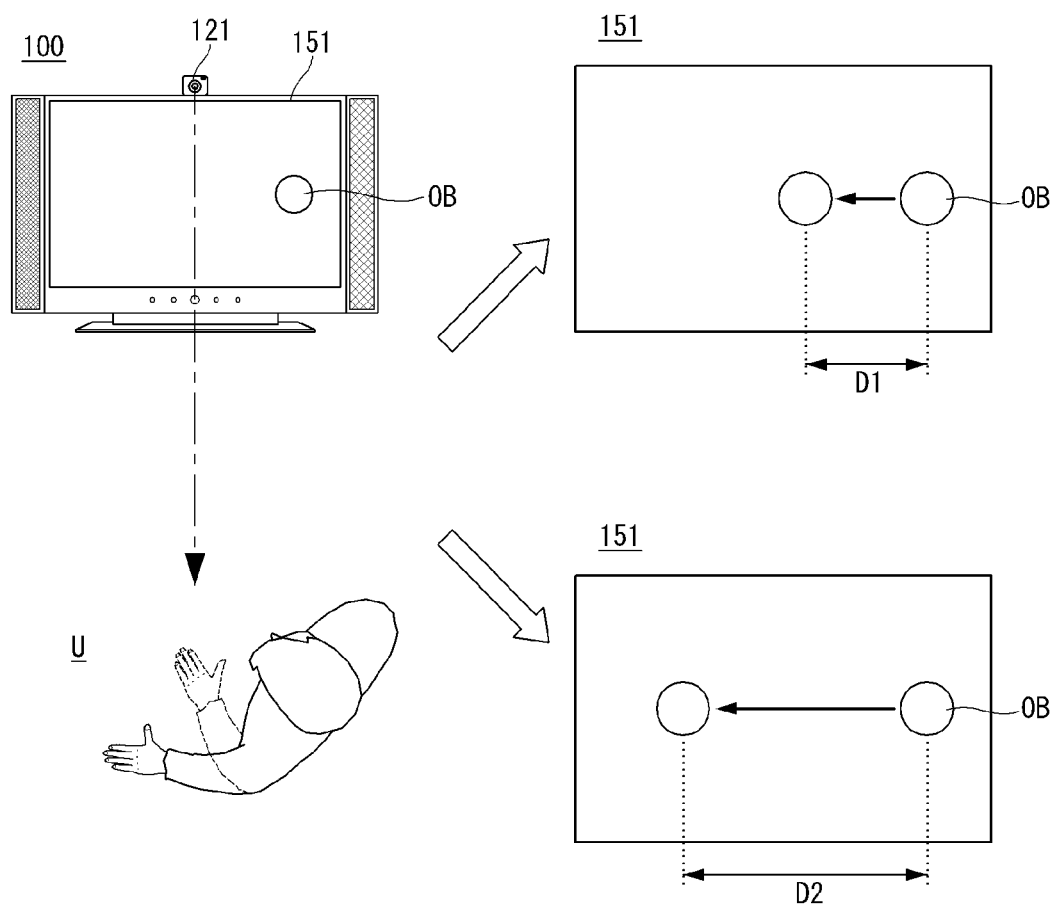
FIG. 10 is a view for explaining an operation of executing a function mapped to a gesture acquired in the operation shown in FIG. 2.

FIG. 10 illustrates the operation of executing the function mapped to the acquired gesture, shown in FIG. 2.

Referring to FIG. 10, the display device 100 may display the object OB on the display 151. The object OB can be moved on the display 151 according to a degree to which the user U moves the left hand. The user U may stand at an angle to the camera 121.

If the user's position that is not parallel with the camera 121 is not considered, the trace of the user's gesture may not be correctly reflected in the operation of executing the function of moving the object OB displayed on the display 151, and thus the object OB can be moved only by a first distance D1.

If the user's position with respect to the camera 121 is considered, the trace of the user's gesture can be correctly reflected in the operation of executing the function of moving the object OB, and thus the object OB can be moved by a second distance D2 corresponding to the trace of the user's gesture. According to the display device 100 in the present embodiment of this document, the gesture the user U intends to make can be correctly reflected in the operation of executing the function so as to improve the operation reliability of the display device 100.

Figure 11:
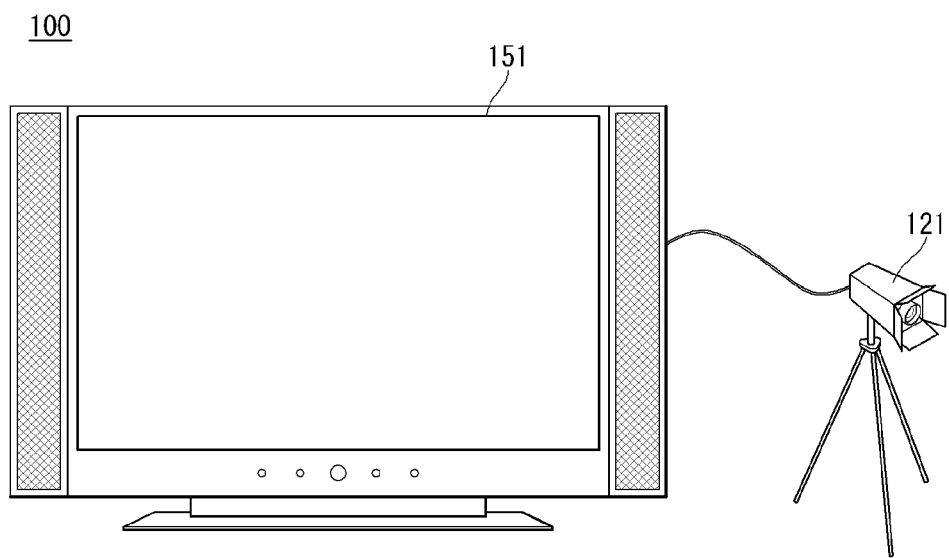
FIG. 11 illustrates another implementation of the display device.

FIG. 11 illustrates another implementation of the display device 100.

Referring to FIG. 11, the camera 121 may be separated from the main body of the display device 100. In this case, the photographing direction of the camera 121 with respect to the plane of the display 151 of the display device 100 can be arbitrary controlled.

Figure 12:
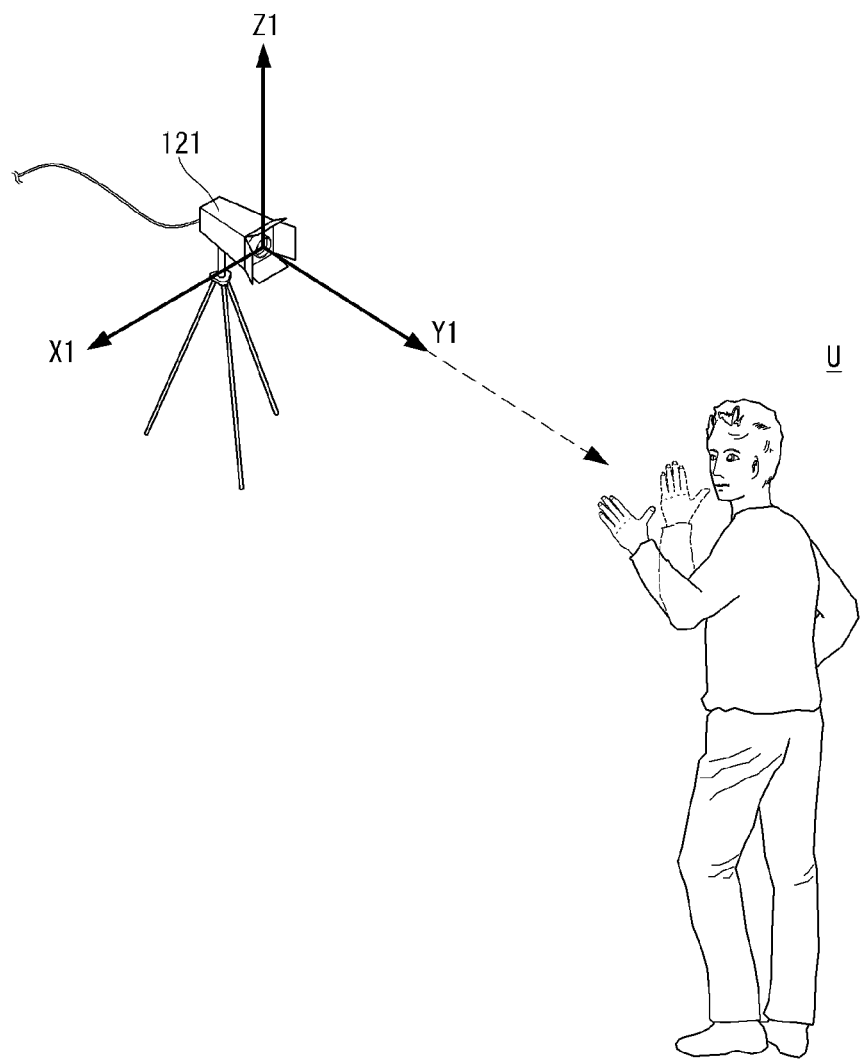
FIGS. 12 and 13 illustrate the camera of the display device shown in FIG. 11.
Figure 13:
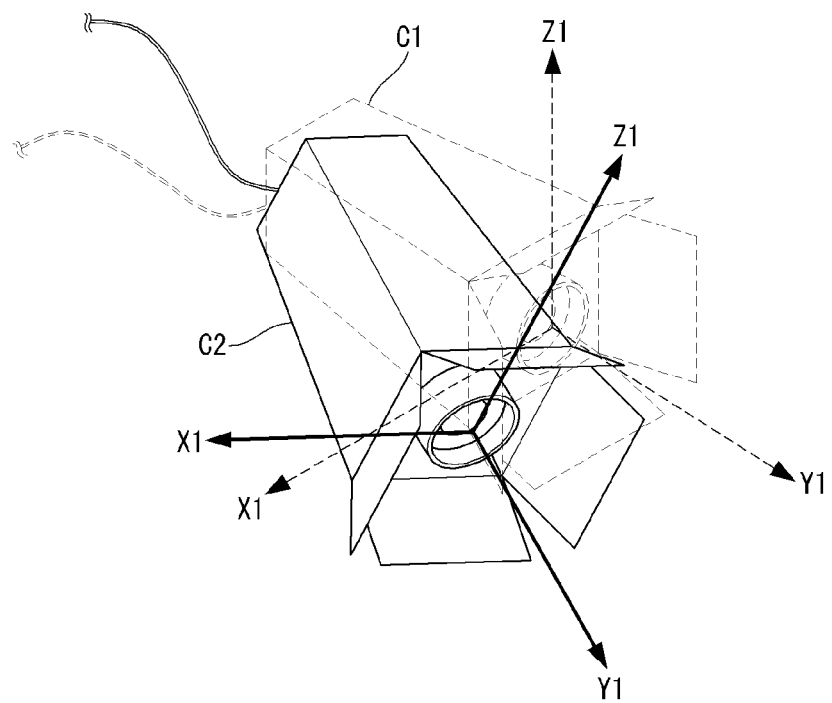

FIGS. 12 and 13 illustrate the camera 121 shown in FIG. 11.

Referring to FIG. 12, the camera 121 may face the user U. That is, the photographing direction of the camera 121 may face the user U. In this case, first photographing coordinates X1-Y1-Z1 faces the user U, and thus a user's gesture can be photographed without having distortion.

Referring to FIG. 13, the camera 121 may face second photographing coordinates X2-Y2-Z2 different from the first photographing coordinates X1-Y1-Z1. That is, the camera 121 is not in a first photographing position C1 that correctly faces the user U and is in a second photographing position C2. In this case, an image of the user U, captured by the camera 121, may be rotated.

FIG. 14 shows images according to the camera positions shown in FIG. 13.

FIG. 14(a) shows a first image UC1 of the user, captured by the camera 121 in the first photographing position C1 shown in FIG. 13. As shown, the direction X1-Z1 of the user's gesture can be correctly recognized when the camera 121 is in the right position. That is, when the user raises the left hand and waves it from side to side, the controller 180 shown in FIG. 1 recognizes that the user's gesture is made in the direction X1.

FIG. 14(b) shows a second image UC2 of the user, captured by the camera 121 in the second photographing position C2 shown in FIG. 13. As shown, the direction of the user's gesture can be distorted when the camera 121 is in a wrong position. That is, when the user raises the left hand and waves it from side to side, the controller 180 shown in FIG. 1 recognizes that the user's gesture is made in the direction X1-Z1. This distortion can become serious when the camera 121 located in the three-dimensional space is rotated to more than two-axis directions. When the controller 180 shown in FIG. 1 recognizes a user's gesture as a gesture in the direction X-Z although the user U makes the gesture in the direction X, the function that the user wants to execute may not be executed.

Figure 15:
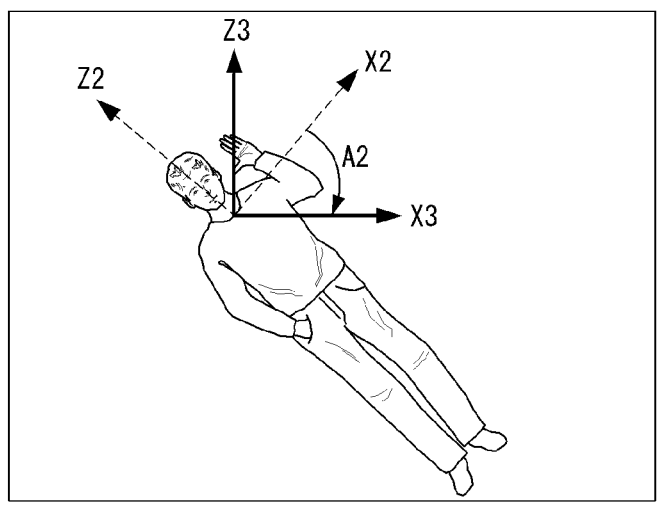
FIGS. 15 and 16 illustrate synchronization of an image captured by the camera shown in FIG. 13.
Figure 16:
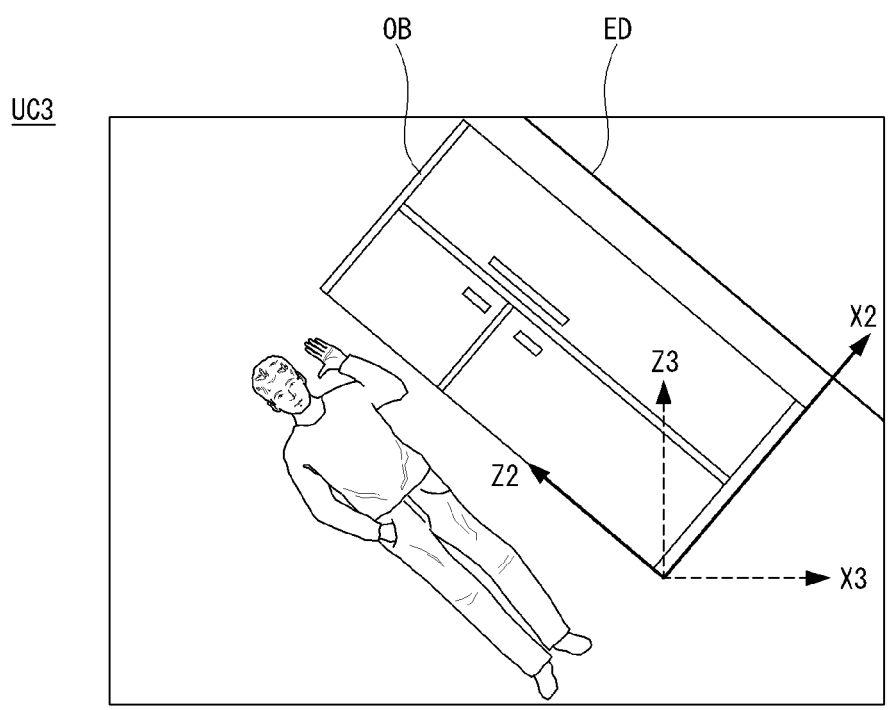

FIGS. 15 and 16 illustrate synchronization of an image captured by the camera shown in FIG. 13.

Referring to FIG. 15, the controller 180 shown in FIG. 1 can set third image coordinates X2-Z2 in the second image UC2 captured by the camera 121 based on the shoulder line of the user U. When the third image coordinates X2-Z2 are set, the controller 180 shown in FIG. 1 can detect a rotation of the X2 axis corresponding to the shoulder line from the axis X3 parallel with the ground by an angle A2. Accordingly, the controller 180 shown in FIG. 1 can rotate the second image UC2 clockwise by the angle A2 to prevent image distortion. Furthermore, the controller 180 shown in FIG. 1 can apply the trace of the user's gesture to trigonometrical function to acquire the direction of the gesture actually made by the user U instead of rotating the image.

Referring to FIG. 16, the controller 180 shown in FIG. 1 can determine a tilting degree of the image from a background image included in a third image UC3. The edge ED on which a wall and a wall meet is perpendicular to the ground, in general. In addition, vertical edges of a rectangular electronic apparatus OB such as a refrigerator and furniture are perpendicular to the ground, in general. Accordingly, the third image coordinates X2-Z2 can be set based on the edge ED of the electronic apparatus OB or the edge ED on which a wall and a wall meet. When the third image coordinates X2-Z2 are set, the third image coordinates X2-Z2 can be rotated to the direction of the X3 axis parallel with the ground to be synchronized with the camera coordinates. The trace of the user's gesture can be acquired without having distortion through the synchronization of the image coordinates and the camera coordinates.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of this document. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a camera configured to capture an image and to recognize a first gesture of a user; and
    a controller configured to:
        extract a background image included in the captured image;
        set a direction of a user included in the captured image, based on an entity substantially perpendicular to or parallel with the ground, which is included in the extracted background image;
        correct the image such that the direction of the user is synchronized with the photographing direction of the camera;
        extract a second gesture of the user, included in the corrected image, wherein a first displacement corresponding to the first gesture and a second displacement corresponding to the second gesture is different based on a differentiation between the direction of the user and the photographing direction of the camera; and
        execute a function mapped to the second gesture.

2. The display device of claim 1, wherein the direction of the user is set based on at least one of a shoulder line of the user, a direction of the face of the user and a direction of the body of the user, which are included in the obtained image.

3. The display device of claim 1, wherein the entity corresponds to at least one of at least one wall, at least one floor, a first edge on which walls meet, and a second edge on which the at least one wall and the at least one floor meet.

4. The display device of claim 1, wherein the synchronization makes the direction of the user parallel with the photographing direction of the camera.

5. The display device of claim 1, wherein the synchronization makes the direction of the user face a virtual plane substantially perpendicular to the photographing direction of the camera.

6. A display device comprising:
a camera configured to capture an image and to recognize a first gesture of a user; and
a controller configured to:
extract a background image included in the captured image;
set image coordinates based on a direction of a user included in the captured image, based on an entity substantially perpendicular to or parallel with the ground, which is included in the extracted background image;
synchronize the image coordinates with camera coordinates based on the photographing direction of the camera to correct the image;
extract a second gesture of the user, included in the corrected image, wherein the first gesture and the second gesture is different according to differentiation between the direction of the user and the photographing direction of the camera; and
execute a function mapped to the second gesture.

7. The display device of claim 6, wherein the synchronization makes a first axis corresponding to one of axes forming the image coordinates parallel with a second axis corresponding to one of axes forming the camera coordinates.

8. The display device of claim 6, wherein the image coordinates and the camera coordinates are rectangular coordinates.

9. A method of controlling a display device, comprising:
capturing an image through a camera;
recognizing a first gesture of a user through the camera;
extracting a background;
setting a direction of a user included in the obtained image, based on an entity substantially perpendicular to or parallel with the ground, which is included in the extracted background image;
correcting the image such that the direction of the user is synchronized with the photographing direction of the camera;
extracting a second gesture of the user, included in the corrected image, wherein a first displacement corresponding to the first gesture and a second displacement corresponding to the second gesture is different based on a differentiation between the direction of the user and the photographing direction of the camera; and
executing a function mapped to the second gesture.

10. The method of claim 9, wherein the direction of the user is set based on at least one of a shoulder line of the user, a direction of the face of the user, and a direction of the body of the user, which are included in the captured image.

11. The method of claim 9, wherein the synchronization makes the direction of the user and the photographing direction of the camera parallel with each other.

12. The method of claim 9, wherein the synchronization makes the direction of the user face a virtual plane at a right angle to the photographing direction of the camera.

13. The method of claim 9, wherein the capturing of the image comprises extracting a background image included in the image.

14. The method of claim 13, wherein the direction of the user is set based on an entity substantially perpendicular to or parallel with the ground, which is included in the extracted background image.

15. The method of claim 14, wherein the entity corresponds to at least one of at least one wall, at least one floor, a first edge on which walls meet, and a second edge on which the at least one wall and the at least one floor meet.

* * * * *